June 14, 1932.  S. F. ARBUCKLE  1,863,547
ILLUMINATING DEVICE
Filed April 3, 1924
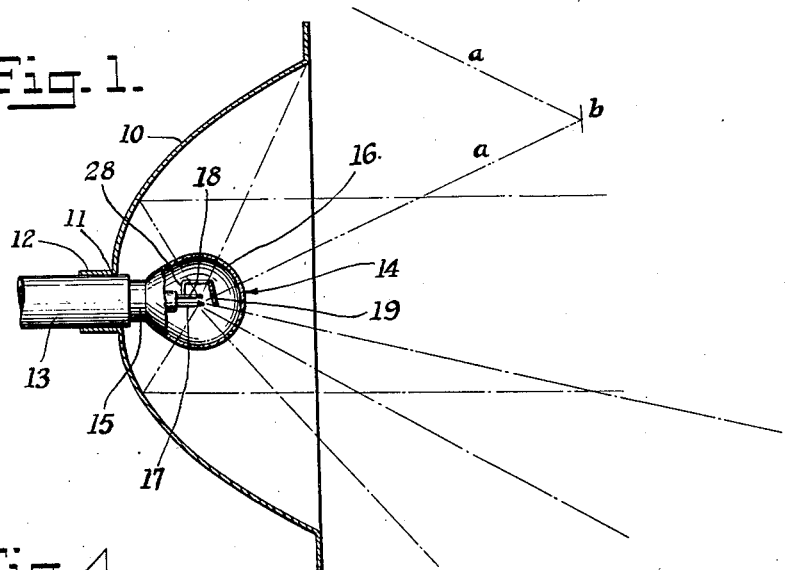
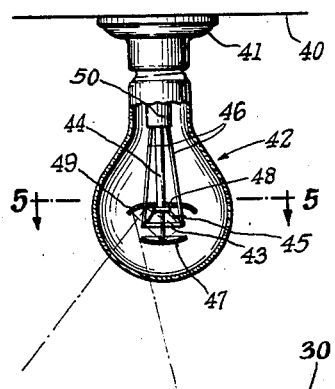
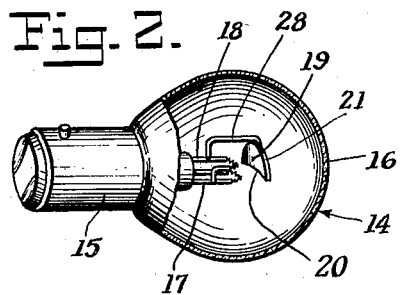
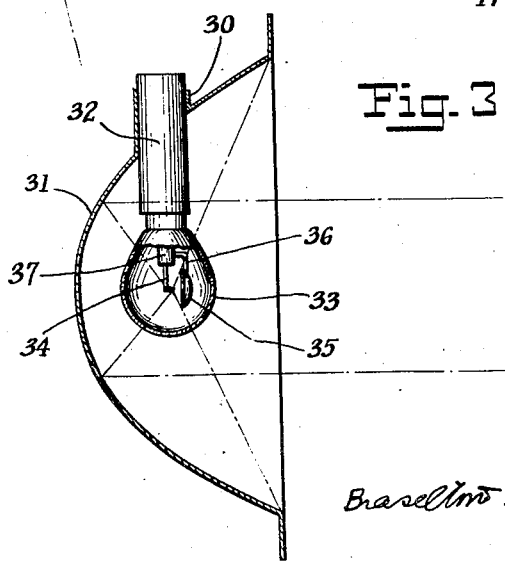
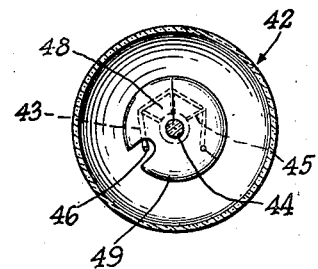
INVENTOR
*Samuel F. Arbuckle*
BY
Braselton Whitcomb and Des Jardins
ATTORNEYS Patented June 14, 1932

1,863,547

UNITED STATES PATENT OFFICE

SAMUEL F. ARBUCKLE, OF DETROIT, MICHIGAN, ASSIGNOR TO MONOGRAM LENS CORPORATION, OF DETROIT, MICHIGAN, A CORPORATION OF DELAWARE

ILLUMINATING DEVICE

Application filed April 3, 1924. Serial No. 703,846.

This invention relates to improvements in illuminating devices, for instance, such as are usable in connection with automotive vehicles for illuminating the road. More particularly, the invention relates to lamps for use in automobile headlights, or the like, in which means are provided for eliminating glare in front of a lamp and also permitting a high degree of visibility when the vehicle to which the lamp is attached is moving through heavy mist or fog.

Heretofore, in the development of illuminating means for road vehicles, emphasis has been laid upon providing a lamp which takes care of ordinary driving conditions. It has been proposed to meet such requirements by providing means for varying the intensity or distribution of the illumination from a lamp, incorporated in dimming apparatus or a lens construction which modifies the light beam in such a way as to give a distributed beam of light. When driving an automotive vehicle, however, under weather conditions in which heavy mists obscure the vision of the operator, the ordinary type of illumination is deficient for the reason that the light rays striking the bank of mist particles in front of the car are reflected rearwardly. The direct rays from the light source may often be reflected by the mist particles at such angles as to strike the eyes of the driver, thus making it exceedingly difficult to operate the vehicle. In my Patent No. 1,635,879, I have disclosed means for overcoming the difficulties above indicated by providing a light impervious shield in the lamp in front of the electric light bulb so that the direct light rays projected forwardly from the light source in a direction parallel to the lamp axis or inclined upwardly at an angle thereto or cut off. The shield shown in my above mentioned patent is preferably designed so that the forwardly projected light rays which are below the plane including the axis of the lamp are unobstructed, thus providing illumination immediately in front of the vehicle.

It is one of the important objects of the present invention to provide means for cutting off the direct light rays, forwardly projecting or emerging in an upwardly inclined direction from the light source by means positioned entirely within the electric light bulb utilized in the lamp. It is a further object of the invention to eliminate the necessity of adjustment of the shield relative to the filament or light source and also to the reflector and the lens. Another object is to provide improved means for eliminating glare from automobile headlights, from the viewpoint of an observer in the rear. An object of the invention also is to provide a shielding device which is usable either on electric lamps or lamps having other sources of light. Another object contemplated is the provision of means for obstructing any portion or segment of the total direct rays emanating from the light source which are detrimental to visibility.

In general, my present invention consists in mounting in an electric light bulb means for cutting off a predetermined portion of the light rays emanating from the filament or other light source in the bulb. Such means may take the form of a shield, which may be curved, this shield having such relationship to the light source that all or an effective portion of the direct light rays which emanate forwardly and upwardly are cut off. This may be accomplished in the case of electric lamps, for example, by securing the shield to a support fixed either to the stem of the lamp or to one of the leading-in wires of the filament, although various other supporting means may be utilized.

My invention may contemplate also the use of such a light bulb and shield in connection with a reflector and, in some cases, a lens such as are used in automobile headlights.

Various other objects such as relate to details of construction and economies of manufacture will be apparent from consideration of the detailed description to follow. I accomplish the objects of my invention in one instance by the means described in detail in the following specification; my invention is clearly defined and pointed out in the appended claims.

A structure which may be a preferred embodiment of my invention is illustrated in the accompanying drawing, in which:

Fig. 1 is a vertical section through the electric lamp incorporating my invention, the lamp being mounted within a reflector;

Fig. 2 is a view partly in perspective of the lamp of Fig. 1;

Fig. 3 is a view of a modified arrangement of the light shield and lamp; and

Figs. 4 and 5 are views of a further modification of the invention.

Referring to Fig. 1, there is disclosed a reflector 10, which is preferably of parabolic curvature, the base of which is apertured as at 11 forming a flange 12 in which the lamp connector 13 is positioned. Within the connector 13, the lamp 14 is removably mounted, this lamp being of the electrical type and including a base 15 and a transparent bulb 16 enclosing the light source and shield as presently will be described. I have shown a light source as consisting of two filaments 17 and 18, although the invention may be advantageously employed with a lamp containing a single filament. These two filaments are positioned one above the other and are designed to be used separately depending on driving requirements and road conditions.

Fixed to the leading-in wire of one of these filaments by any suitable means is a support wire 28 extending above the filaments and off-set to a point in front of the same, the end terminating in the depending shield 19, clearly shown in Fig. 2. This shield 19 is in the form of a sector of a curvilinear surface bounded by a lower edge 20 lying substantially in a horizontal plane just below the horizontal axis of the lower filament and a curved upper edge 21 joining the ends of the edge 20. The shield 19 is placed directly in front of the filaments 17 and 18 and the dimensions thereof are such that light rays emerging from either one or both of the filaments in a forward direction either on a horizontal axis or projecting upwardly from the horizontal, are cut off. In other words, to the observer in front of a lamp only such direct rays from the filaments are visible as are projected downwardly from the lamp beneath the lower edge 20 of the shield. The upper curved boundary 21 of the shield is such as to cut off the upper direct rays which normally would emerge from the lamp without contacting with the reflecting surface, none of the rays to the reflector being cut off.

In Fig. 3, I have shown a modification of my invention in which the lamp bulb is led into the reflector from the top thereof instead of from the rear. An aperture 30 is in the top of the reflector 31 in which a connector unit 32 is positioned holding at its lower end the detachable electric lamp bulb 33. The lamp bulb in this form of the invention is shown with a single filament 34 and a circular shield sector 35 supported by the bracket 36 fastened to the stem 37 of the lamp. The shield 35 is in the form of a shell cut from a curvilinear surface, the center of which lies on the line containing the axis of the filament, and the bounding limit of the shield is circular extending to such points in relation to the filament that while none of the rays to the reflector are cut off, all forwardly directed rays which normally would emerge without reflection are obstructed, the total illumination from the lamp being from reflected rays.

In general, the results obtained by the lamp of Fig. 1 and the modification of Fig. 3 are similar in that in both, direct rays from the filaments of the lamps which are projected forwardly at a parallel or upward angle without reflection from the reflector of the lamp are cut off. Two important results follow from this construction. The first result arises from the fact that when operating an automotive vehicle under such weather conditions that heavy mist obscures the roadway, rays projected forwardly at an upward angle are reflected from the mist particles toward the driver of the vehicle as indicated by the dotted line $a$ of Fig. 1, the mist particles being represented by the letter $b$. Consequently, the driver has his vision of the roadway obscured by this diffused illumination which increases with the increase in candle power of the light source. In accordance with my invention, I eliminate this intermediate reflection from the mist particles by providing a shield 19 in the form of Fig. 1 or the shield 35 in the modification of Fig. 3 which cuts off such radiation as would reflect into the eyes of the operator and thus secure effective and efficient illumination for weather conditions of the sort described.

Another important result arising from the use of the shield is that glare resulting from the emanation of direct rays from the light source and affecting an observer in front of the light source is removed. In most types of automobile headlights on the market, there are no means provided for controlling direct rays emerging in an upward direction from the lamp, these rays combining with those displaced because of defects of lamp adjustment to cause glare to the observer. This result is greatly intensified where a second filament as in Fig. 1 is employed which is slightly out of focus and which also may have an increased candle power or which may be used simultaneously with the other filament. Where both filaments are used simultaneously, the effect of the combined direct rays from both filaments is very difficult to control but through the shield device, a very simple and effective means is provided which totally eliminates glare arising from direct forwardly projected light rays.

A feature of the invention as disclosed in Figs. 1 and 2 is that only such forwardly projected light rays which would cause difficulty to the observer in front of the reflector or to the driver in the rear of the reflector are cut off, those forwardly projected rays which are inclined toward the ground being unobstructed. This results in increased illumination for driving, as the shield permits illumination of the road bed directly in front of the vehicle while at the same time cutting off the upwardly directed rays. However, it is within the scope of my invention to cut off entirely the unreflected rays from the light source in accordance with the showing in Fig. 3 in which I utilize a circular sector 35. In this form of my invention, I control all of the light rays emanating from the light source since all of the light rays which are not intercepted by a formed reflecting surface are intercepted and cut off by the shield. I desire to point out further that I do not wish to be limited to the specific means for supporting the shields in front of the filament disclosed in Figs. 1 and 2, in which the shield is mounted upon the leading-in wire of the filament, or in Fig. 3, in which the shield is supported from the stem of the lamp, the stem being fused into the glass. Various other means of supporting the shield will be obvious. For example, I may secure the shield to the interior of the bulb in front of the filament, the dimension of the same in this relationship being considerably increased so as to cut off the requisite amount of direct rays. The shields 19 and 35 have been shown as of shell-like formation with curvilinear surfaces, this construction being desirable especially where the shield is positioned so close to the filament that consideration must be given to heat radiation. It has been found desirable that, as far as possible, the shield should not restrict unduly the radiation of heat from the filament and this I have accomplished by curving the shield or plate in the manner shown. However, it is possible, especially where the shield is not too close to the filament, to form the same as a flat plate instead of curved as shown.

Note should be made further of the fact that variations in the shield material are contemplated as coming within the scope of the invention. For ordinary uses, a substance impervious to light is desirable but under some conditions it may be desirable to construct a shield of translucent material so that only a portion of the upwardly projected light rays are cut off, the underlying consideration being that such direct rays as tend to produce unsatisfactory and difficult operating conditions should be eliminated.

In Figs. 4 and 5 of the drawing, I have shown my invention as applied to general illumination rather than as related to illumination for automobiles. To the support 40, which may be the ceiling of a room, is attached the socket member 41 adapted to receive the base of a lamp 42. The lamp shown is of the high candle power type with a circular filament 43 horizontally supported from the support rod 44 in the lamp by means of wires 45. The lead-in wires 46 connect the ends of the filament 43 to the power circuit.

Directly beneath the filament 43 is placed the plate 47. This plate is shown as curved, its center of curvature being above the plate, and its dimensions are such, relative to the filament, that a large portion of the direct rays from the filament are cut off, the illumination directly below the plate resulting from indirect reflection. This illumination may be intensified by silvering or similarly treating the upper surface of the shield.

For some uses, the lamp as described with the single upwardly reflecting shield 47 has been found very efficient and useful, especially in so-called indirect lighting. In this method of illumination, the direct light rays are cut off and reflected from the plate 47 and projected against and re-reflected from the support wall, thus causing a scattering of the light rays and a wide spread light distribution. I have found, however, that for some applications, the utilization of a secondary reflecting shield 48 which may be flexible and is supported from the rod 44 is desirable, upon which the light rays from the reflecting surface of plate 47 impinge.

Preferably, the reflector 48 has a longer curvature radius than that of plate 47, so that the light rays are broadly scattered at all angles from the second plate, as indicated in Fig. 4. To aid the light distribution, I may form the portion of the shield adjacent its edge curved more than the remaining portion, as at 49.

Various advantages result from the lamp construction of Fig. 4. The inclusion of the reflecting plates 47 and 48 within the lamp obviates entirely the necessity for external reflecting surfaces. Furthermore, since the light distribution is dependent on the curvature of the reflecting plates, the illumination is very easily controlled. Then, also, it is obvious that additional glare preventing devices are unnecessary as all direct rays may be cut off and the reflected light scattered to prevent concentrated intensity.

In the drawing, the plates 47 and 48 are shown as having an approximate spherical curvature. I do not desire, however, to confine my invention to plates so constructed. For example, for some types of illumination, it is desirable that a straight bar filament be used, in conjunction with which a cylindrically curved reflecting shell either below or above, or both above and below might be used. Moreover, in the embodiment of Fig. 4, instead of being curved downwardly as shown, the plate may be flat or reversely curved with its curvature center above the plate instead of below. In this embodiment also the use of translucent plates is, for some applications, contemplated.

Various other modifications of the invention may, of course, be made without departing from the spirit of the invention and, therefore, I desire to claim the invention broadly as well as specifically, as indicated by the claims hereto appended.

Having thus described my invention, what I claim as new and useful and desire to secure by Letters Patent is:

1. In an electric light unit, the combination of a bulb, a light emitting filament within the bulb, a light shield within and on one side of said filament, and a second shield within and on the other side of said filament, one of said shields being translucent.

2. In an electric light unit, a glazed envelope; a supporting stem within said envelope; a reflecting element; a light source adjacent said reflecting element; a second reflecting element adjacent said light source and opposed to said first reflecting element, said light source and reflecting elements being supported by said stem and both of said reflecting elements being adapted to intercept light from said source.

3. In an electric light unit, the combination of a glazed envelope; a light source within said envelope; a pair of reflecting elements within said envelope spaced from said envelope and so positioned as to intercept and redirect a portion of the direct rays of light emitted from said source, one of said reflecting elements being adapted to redirect intercepted rays to all areas from which rays have been excluded by the other.

4. In an electric light unit, a glazed envelope; a light source within said envelope; a pair of reflecting elements opposed to each other within said envelope and spaced from each other and from said envelope and said light source and so positioned as to intercept and redirect a portion of the direct rays emitted from said light source, one of said reflecting elements being adapted to redirect intercepted rays to all of said areas from which rays have been excluded by the other.

5. In a device of the class described comprising a glazed envelope having an electrical contact base therefor, a light source within said envelope, a reflector within said envelope adjacent said light source and positioned between said light source and said base, and means on the other side of said light source for intercepting a portion of the direct rays therefrom to exclude the same from an area therebehind, said reflector being adapted to redirect intercepted rays to the area from which rays have been excluded by said means.

6. In a device of the class described a glazed envelope, a stem within said envelope, a reflector supported by said stem at a point spaced from the end thereof, a light source supported at the end of said stem, and means on the other side of said light source to intercept a portion of the direct rays therefrom, said means and said reflector cooperating to redirect light to all areas from which light has been excluded by said intercepting means.

In testimony whereof, I affix my signature.

SAMUEL F. ARBUCKLE.